Patented Dec. 22, 1936

2,065,404

UNITED STATES PATENT OFFICE 2,065,404

GLASS-TO-METAL SEAL

Howard Scott, Forest Hills, Pa., assignor to Westinghouse Electric & Manufacturing Company, East Pittsburgh, Pa., a corporation of Pennsylvania No Drawing. Application July 19, 1934, Serial No. 736,049

8 Claims. (Cl. 49—81)

My invention relates to glass-to-metal seals and it has particular relation to fused joints or seals between glasses of the commercially available soft grades and ferrous-base alloy compositions.

Vacuum-tight joints of a wide variety of forms are now extensively required in the construction of many electrical devices particularly radio transmitting, rectifier, X-ray and other electronic tubes. In the making of such seals between commercial grades of glass, particularly those of the so-called soft compositions now widely used, and metals having properties suitable for proper fusion with the glass and also for service as a member or element of the electronic tube or other device, difficulty has been experienced in causing the metal to properly "wet" or intermingle with the glass in the intimate manner necessary for the production of a satisfactory joint.

This difficulty is especially serious because the metals heretofore widely used in sealing operations, notably copper and copper-faced alloys, tungsten and molybdenum are unsuitable for use in certain types of gaseous conduction devices. Thus, copper forms joints which have lower resistance to thermal shock than is permissible in some devices and in addition is attacked when mercury is contained within the device. Likewise, tungsten and molybdenum are unduly expensive and incapable of being readily fabricated into structural shapes other than simple wire leads.

I have found that certain iron-base compositions made up principally of iron and nickel, together with added quantities of cobalt, manganese and other components of steel, are especially suitable for the making of seals with glasses, particularly those of the so-called hard grades, and other comparable vitreous materials. Such improved alloys, which are more completely described in United States Patents Nos. 1,942,260 and 1,942,261, which issued to me January 2, 1934, are low in cost, easily fabricated, rolled or otherwise formed into convenient shapes and are not attacked by mercury vapor. They furthermore may be made to have reversible and substantially constant expansivity characteristics which accurately match those of the grades of glass now commercially available, and, in addition, they have excellent high temperature strength.

When attempted to be used with soft glasses, which have considerably higher expansivities than do hard glasses, such alloys have unsatisfactory "wetting" characteristics. Wetting is the solution by the glass of oxides formed on the surface of the metal during heating, which oxides are, at the elevated temperatures encountered in making the seals, produced by a reaction with oxygen from the surrounding air with the component metals of the alloy. Previously used alloys of iron and nickel form surface oxides having melting points much above the ordinary temperatures encountered in the blowing of soft glass, which oxides are accordingly so difficult to fuse as to prevent the making of a satisfactory seal with soft glass without overheating the glass.

The general purpose of the present invention is to provide seals between soft glass and ferrous-base alloy compositions which overcome the disadvantage named and which possess additional advantages to be particularized hereinafter.

One object of my invention, therefore, is to provide satisfactory seals between soft glasses and ferrous base alloys which have expansivity characteristics corresponding to those of the glass and inflection temperatures in excess of the strain point of the glass.

Another object of my invention is to provide seals of the above specified character in the formation of which there is produced at normal glass-working temperatures a low-melting, dense and firmly adherent oxide on the surface of the metal, which oxide readily fuses or intermingles with the glass.

In my copending application Serial No. 736,048 filed July 19, 1934, and assigned to the same assignee as this invention, there are described a number of improved alloy compositions of the ferrous-base class which are characterized by an ability to form upon their surfaces, when heated in air, low-melting and firmly adherent oxides which easily fuse, at the ordinary glass-blowing temperatures, with glasses of the so-called soft grades. The present invention resides in the making of seals between soft glass and those improved compositions.

In the formation of those particular compositions there is added to the basic mixtures of iron and nickel one or more of the elements cobalt, manganese, chromium, silicon, aluminum and boron in such proportions that the resulting alloys, in addition to matching the expansion characteristics of soft glasses ranging in expansivity from $7 \times 10^{-6}$ to $11 \times 10^{-6}$ per degree centigrade, are so readily wet by soft glass as to permit of an intimate fusion therewith. As before explained, wetting is simply a solution by the fluid glass of the oxide formed on the surface of the metal being sealed. To constitute a strong adherent joint, this oxide in addition to being easily fused by the glass, must be tough, dense, and tightly bound to the metal. The improved alloys referred to are capable of forming oxides of this character at the relatively low temperatures encountered in the making of soft glass seals.

In adding to the iron-nickel mixtures substantial quantities of one or more of the elements cobalt, manganese, chromium, silicon, aluminum and boron, which additions improve the fusibility and adherence characteristics of the oxide films, the expansion properties are caused to match those of the particular glass into which it is desired to seal, by adjusting the nickel and cobalt content with respect to that of the other added elements. By a somewhat comparable adjustment of the named ingredients the inflection temperature, which is the maximum at which the coefficient of expansion of the alloy remains at the low uniform value, is maintained above the strain point of the glass by the substantial margin necessary to permit the formation of a satisfactory joint. For soft glasses, the strain point which is defined as the lowest temperature at which stresses can be released or very nearly so in a relatively long given period of annealing such as 18 hours, is usually around 350° C. To properly seal into such glasses, an inflection temperature of approximately 400° C. is desirable.

Thus, in the production of the described alloys, the additions to the basic mixtures of iron and nickel of one or more of the elements cobalt, manganese, chromium, silicon, aluminum and boron are made in such special proportions that the resulting alloy compositions have properties allowing them to seal directly into soft glasses of expansivities ranging from $7 \times 10^{-6}$ to $11 \times 10^{-6}$ per degree C., have inflection temperatures preferably around 400° C., and are, at the relatively low glass melting temperatures so readily "wet" by soft glass as to permit of an intimate fusion therewith. The resistivity characteristics of the alloys are subject to substantial reduction when the cobalt content is made as high as permissible.

For example, as the nickel content of the subject alloys is lowered, both the expansivity and the inflection temperatures are also lowered, and vice versa. An addition of manganese (above the small quantity, usually less than 1%, incorporated in commercial alloys to enhance forgeability) has the effect of raising the expansivity and lowering the inflection temperature. An addition of chromium has a similar effect. Cobalt, on the other hand, when substituted for nickel, lowers the expansivity without modifying the inflection temperature. It also contributes to the production of the desired fusible oxide on the surface of the alloy when heat is applied in the presence of air. Chromium, manganese, silicon, aluminum and boron when introduced into the alloy mixture either separately or together, similarly improve the fusibility of the oxide film. Cobalt also materially lowers the resistivity of the alloy.

By way of illustration, consideration may now be given to alloys so specially compounded as to be suitable for sealing into widely used soft glasses, of which the compositions of Table I are representative:

*Table I—Soft-glass compositions*

| Glass | a | b | c | d | e |
|---|---|---|---|---|---|
| Percent | | | | | |
| SiO$_2$ | 63 | 61.6 | 69.7 | 69.4 | 67.1 |
| Na$_2$O | *14 | 12.8 | 18.3 | 14.0 | 14.9 |
| K$_2$O | (*) | 0.9 | 0.3 | 4.9 | 5.1 |
| Mn$_3$O$_4$ | | | 4.8 | | |
| MgO | | | | 4.8 | |
| Al$_2$O$_3$ | | 0.4 | 1.2 | 1.0 | 6.3 |
| PbO | 21 | 22.6 | | | |
| CaO | | | 5.1 | 5.3 | 6.6 |

*Na$_2$O+K$_2$O.

In addition to the compositions above listed, which have expansivities ranging from 7 to $11 \times 10^{-6}$/° C. and an inflection temperature of about 350° C., a recently developed vitreous material known in the trade as Mycalex, has substantially equivalent characteristics and hence presents comparable problems as regards sealing with ferrous-base alloys. This material, which is made up approximately 60% of finely ground mica and 40% of powdered lead borate fused therewith under heat and pressure, can be sealed into by the alloy compositions about to be described as satisfactorily as can the soft glasses. My invention, therefore, includes also seals in which this new glass-substitute is the vitreous-material member.

Specific combinations of the above discussed elements which constitute alloys having a reversible mean expansivity of approximately $9.2 \times 10^{-6}$, which is that possessed by glass (a) of Table I, from zero to 400° C. and wetting characteristics satisfactory for the making of junctures with soft glass and other comparable vitreous materials, are given in Table II.

*Table II—Alloy compositions*

| Alloy mixture | Percentage content of— | | | | |
|---|---|---|---|---|---|
| | Iron* | Nickel | Cobalt | Manganese | Chromium |
| a | 49.1 | 47.8 | 0.0 | 3.1 | 0.0 |
| b | 47.5 | 43.7 | 5.0 | 3.8 | 0.0 |
| c | 46.2 | 39.4 | 10.0 | 4.4 | 0.0 |
| d | 43.2 | 31.0 | 20.0 | 5.8 | 0.0 |
| e | 49.8 | 46.5 | 0.0 | 0.7 | 3.0 |
| f | 47.0 | 47.5 | 0.0 | 0.5 | 5.0 |
| g | 34.3 | 48.0 | 10.0 | 0.7 | 7.0 |
| h | 46.0 | 33.8 | 20.0 | 0.2 | 0.0 |
| i | 43.1 | 26.7 | 30.0 | 0.2 | 0.0 |
| j | 40.1 | 19.7 | 40.0 | 0.2 | 0.0 |
| k | 37.0 | 12.8 | 50.0 | 0.2 | 0.0 |
| l | 30.3 | 16.3 | 53.2 | 0.23 | 0.0 |

* Stated values also include nominal contents of deoxidizing and desulphurizing elements and impurities.

To modify these alloys so as to obtain either higher or lower expansivity or inflection temperature, it is only necessary to follow the principles of alloying already set forth in preceding paragraphs. For example, to produce alloys having lower expansivity characteristics, it is merely necessary to raise the content of the nickel in the composition of Table II. In this manner the expansivity may readily be reduced to $7 \times 10^{-6}$ per ° C. from 0 to 400° C., or even lower. Likewise, by increasing the nickel plus cobalt content, the expansively characteristics of the alloys may readily be increased to $11 \times 10^{-6}$ per ° C. or even higher.

It will, therefore, be apparent that my improved alloy compositions just described may be easily adapted to seal directly into soft glasses having a relatively wide range of compositions and expansion properties.

The alloy compositions (a) to (g), inclusive, listed in Table II are based on maximum mangenese plus chromium contents and minimum nickel plus cobalt contents, the object of such proportions being to further the interests of economy by keeping as high as possible the ratio of the content of the first-named pair of metals, which are relatively inexpensive, to the content of the last named pair, which are higher in cost.

It is desired to emphasize that the presented table of alloy compositions is illustrative rather than limiting, it being restricted to additions of the readily oxidized elements chromium and manganese only. Other elements such as aluminum, silicon and boron may be substituted for those elements and may be used in various combinations rather than singly. Thus one may take as a base alloy a nickel plus cobalt content of 47% and manganese content of 0.5%, which alloy has an inflection temperature of about 450° C. A cobalt content of the permissibly high value of 20% produces a mean expansivity of about $5.0 \times 10^{-6}/°$ C. Now manganese, chromium, aluminum, boron, or other elements forming oxides of good adherence and density may be added in such quantity as to bring the mean expansivity up to the value desired, say between 7 and $11 \times 10^{-6}/°$ C. After the making of such additions, however, the cobalt content should be appreciably under 20%, the adjustment being such that the $Ar_3$ transformation point of the iron is kept well below room temperature.

The partial substitution of cobalt for nickel greatly extends the permissible range of compositions. This, for the reason that cobalt lowers the expansivity without changing the inflection temperature of the alloy. With cobalt present, greater quantities of manganese or chromium, or both, may be added, and other elements such as silicon, aluminum and boron introduced, the effect of such introduction being to further enhance the wetting characteristics of the alloy.

Of particular value when high electrical conductivity is desired is a low manganese plus chromium content and a high content of nickel and cobalt. In such alloys, typified by mixtures $(h)$ to $(k)$ of Table II, resistivities approaching 20 microhms per cubic centimeter can be obtained together with excellent wetting characteristics. For example, alloy mixture $(l)$ of Table I has a resistivity of approximately 25 microhms per cubic centimeter and produces an excellent seal into the mentioned glass. Cobalt contents of 15% or more yield the fusible and adherent oxide characteristics desired.

In the alloys which contain high contents of cobalt, the manganese is added principally for the purpose of combining with any sulphur which may be present in order to render it less injurious to the alloy. To accomplish the same result other elements such as zirconium may be substituted for the manganese, or, if desired, the sulphur itself may be directly eliminated from the melting stock to remove the need for the mentioned addition.

In the absence of elaborate precautions, which usually are impractical, small amounts of carbon are present in the completed iron base alloys. During the heating of the metal necessary to seal it into glass, this carbon frequently reacts with the surface oxides to produce gas which forms small bubbles in the glass that impair the quality of the resulting joint. Hence, before making the seal, it is desirable to remove all carbon from at least the surface of the alloy in order to prevent formation of these objectionable bubbles in the glass adjacent to the metal.

Carbon may be removed from the molten alloy by maintaining it in a vacuum in contact with refractory oxides or by passing hydrogen through the metal. This treatment is preferable when the finished piece is bulky. From solidified metal, the carbon may be removed by heating the metal in moist hydrogen for at least two hours at a temperature of 950° C. In the treatment of large sections I prefer to continue this treatment for eighteen hours or more. If the carbon is removed to a considerable depth of the material, this treatment may satisfactorily be given prior to fabrication of the alloy to the final size and shape required for sealing purposes. A preferable practice, however, is to apply the treatment after such fabrication.

A joint between the ferrous base alloy composition prepared as described may, as before pointed out, satisfactorily be made not only with the ordinary or widely used varieties of glass, but also to ceramic materials, glazes, glass-mica compounds and other similar materials which have a mean coefficient of expansion ranging between $6 \times 10^{-6}$ and $15 \times 10^{-6}$ per degree C. over the range of zero to 400° C. It is accordingly to be understood that the term "glass" as here used applies to all vitreous or non-metallic substances or aggregates, it having particular reference to those materials which contain a substantial quantity of silica or which have the property of becoming fluid more or less gradually with increasing temperature.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. A fused joint or seal between a soft glass having an expansivity of from 7 to $12 \times 10^{-6}$ per ° C. and a strain point of about 350° and an iron-nickel alloy incorporating in excess of 1% of an element which enhances the formation, when heated in air, of a readily fusible surface oxide, said alloy having an inflection temperature which is in excess of the strain point of the glass.

2. A fused joint or seal between a soft glass having an expansivity of from 7 to $12 \times 10^{-6}$ per ° C. and a strain point of about 350° C. and a ferrous-base alloy having an inflection temperature in excess of said strain point, said alloy being made up substantially 42 to 50% of nickel plus cobalt with the cobalt content ranging from 0.10 to 20%, in excess of 1% of an element which enhances the formation of a surface oxide which is readily fusible by the glass, and the balance of iron.

3. A fused joint or seal between a soft glass having an expansivity of from 7 to $12 \times 10^{-6}$ per ° C. and a strain point of about 350° C. and a ferrous-base alloy having an expansivity substantially equivalent to that of the glass and an inflection temperature in excess of 350° C., said alloy being made up substantially 42 to 50% of nickel plus cobalt with the cobalt content ranging from 0.10 to 20%, between 1.0 and 5.0% of manganese, and one or more of the following elements, the presence of which enhances the formation of a surface oxide readily fusible by the glass, in the percentages stated: chromium 0.2 to 7.0%, silicon 0.1 to 2.0%, aluminum 0.02 to 1.0%, and boron 0.02 to 1.0%; the balance of the alloy being substantially iron.

4. A fused joint or seal between a soft glass having an expansivity of from 7 to $12 \times 10^{-6}$ per ° C. and a strain point of about 350° C. and a ferrous-base alloy having an expansivity substantially equivalent to that of the glass and an inflection temperature in excess of 350° C., said alloy being made up substantially 50 to 60% of nickel plus cobalt with the cobalt content ranging from 30 to 40%, between 1.0 and 2% of one or more of the elements manganese, chromium, aluminum, silicon and boron, the presence of which enhances the formation of a surface oxide readily fusible by the glass, and the balance substantially of iron.

5. A fused joint or seal between a soft glass having an expansivity of from 7 to $12 \times 10^{-6}$ per ° C. and a strain point of about 350° C. and a ferrous-base alloy having an expansivity substantially equivalent to that of the glass and an inflection temperature in excess of 350° C., said alloy being made up substantially 42 to 50% of nickel plus cobalt with the cobalt content ranging from 5 to 20%, between 1.0 and 5.0% total of one or more of the elements manganese, chromium, silicon, aluminum and boron the presence of which enhances the formation of a surface oxide readily fusible by the glass, and the balance substantially of iron.

6. A fused joint or seal between a soft glass having an expansivity of from 7 to $12 \times 10^{-6}$ per ° C. and a strain point of about 350° C. and an iron-nickel alloy having an expansivity substantially equivalent to that of the glass and an inflection temperature in excess of 350° C., said alloy being made up substantially 44 to 48% of nickel, a substantial quantity, in the aggregate between 1.0 and 7%, of one or more of the elements manganese, chromium, silicon, aluminum and boron the presence of which enhances the formation of a surface oxide readily fusible by the glass, and the balance substantially of iron.

7. A fused joint or seal between a soft glass having an expansivity of from 7 to $12 \times 10^{-6}$ per ° C. and an iron-nickel alloy incorporating in excess of 1% of an element which enhances the formation, when heated in air at ordinary sealing temperatures, of a surface oxide which is readily fusible by the glass.

8. A fused joint or seal between a soft glass having an expansivity of from 7 to $12 \times 10^{-6}$ per ° C. and a ferrous-base alloy which is made up substantially of from 42 to 50% of nickel plus cobalt with the cobalt content ranging from 0.10 to 20%, in excess of 1% of an element which enhances, when the alloy is heated in air at ordinary sealing temperatures, the formation of a surface oxide which is readily fusible by the glass, and the balance of iron.

HOWARD SCOTT.